United States Patent
Pakosh

[11] Patent Number: 5,154,465
[45] Date of Patent: Oct. 13, 1992

[54] WEED PULLER
[75] Inventor: Peter Pakosh, Winnipeg, Canada
[73] Assignee: Kendon Manufacturing Ltd., Canada
[21] Appl. No.: 726,194
[22] Filed: Jul. 5, 1991
[51] Int. Cl.⁵ ............................................. A01B 1/18
[52] U.S. Cl. ................... 294/50.8; 294/19.1
[58] Field of Search ............. 294/11, 19.1, 50.5–50.9, 294/115, 116; 111/101, 106; 172/21, 22, 378

[56] References Cited

U.S. PATENT DOCUMENTS

| | | | |
|---|---|---|---|
| 182,367 | 9/1876 | Jones | 294/50.8 X |
| 528,827 | 11/1894 | Thomas | 294/115 |
| 654,904 | 7/1900 | Marchant | 294/50.8 X |
| 1,025,360 | 5/1912 | Auter | 294/50.7 X |
| 1,466,168 | 8/1923 | Holton | 294/50.5 |
| 1,813,695 | 7/1931 | Brockschmidt | 294/115 |
| 1,885,377 | 11/1932 | Robinson | 294/50.8 X |
| 2,239,108 | 4/1941 | Lindemann | 294/50.8 X |
| 2,358,632 | 9/1944 | Gerken | 294/50.8 |
| 3,463,244 | 8/1969 | McFadden | 294/50.9 X |

FOREIGN PATENT DOCUMENTS

| | | | |
|---|---|---|---|
| 247195 | 2/1925 | Canada . | |
| 17034 | of 1905 | United Kingdom | 294/50.8 |
| 20954 | of 1906 | United Kingdom | 294/50.8 |
| 1600826 | 10/1981 | United Kingdom . | |

Primary Examiner—Johnny D. Cherry
Attorney, Agent, or Firm—Larson and Taylor

[57] ABSTRACT

A weed puller has a head mounted on one end of an elongate stem and a handle on the other end. The head has four blades with pick-up arms that normally extend vertically downwardly from the head. The pick-up arms may be pressed into the ground around a weed and then an actuator lever on the handle pulled to draw the ends of the pick-up arms together to grip a weed under the ground so it can be pulled.

13 Claims, 3 Drawing Sheets

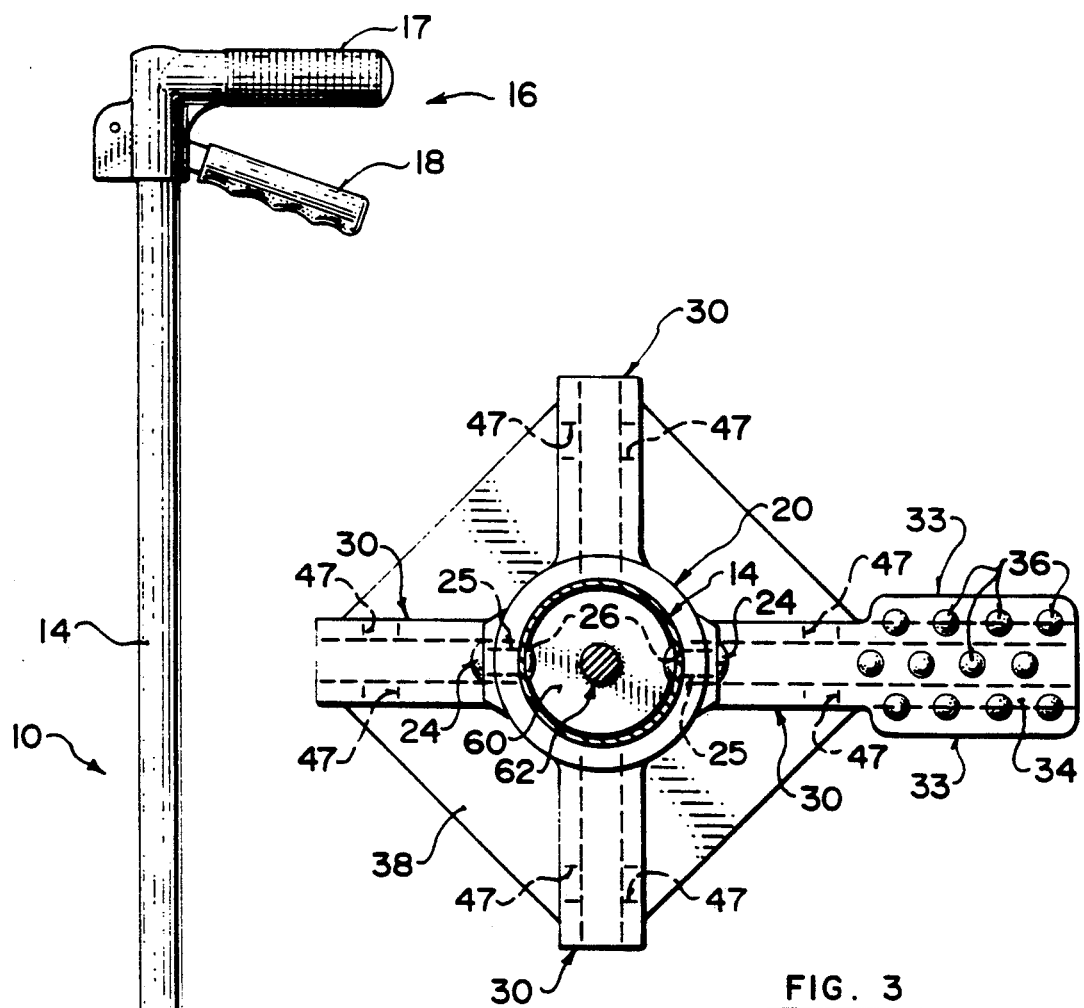
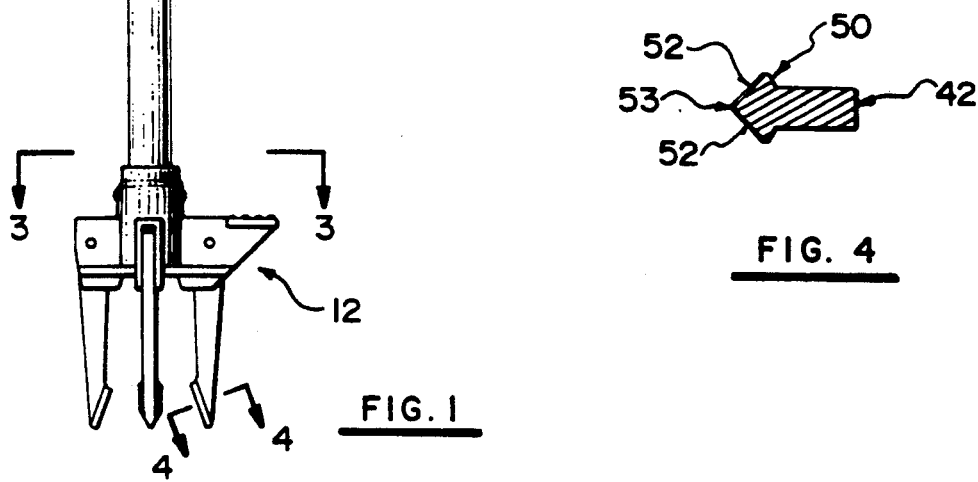

WEED PULLER

FIELD OF THE INVENTION

The present invention relates to a weed pulling tool.

BACKGROUND OF THE INVENTION

In the removal of weed plants from lawns and gardens, it is desireable to pull the entire weed, including the root, from the ground. This is often difficult to do without digging into the ground adjacent the weed and removing a great deal of soil along with the weed root.

One known tool for pulling weeds has two soil penetrating forks that are driven into the soil on opposite sides of the weed. The forks are pivoted together, with the tines of one fork passing between the tines of the other. The tool is then lifted to pull the weed. This tool does not provide a firm grip on the weed under the soil surface to pull the root from the ground. The actual engagement with the weed is very close to the soil surface, and the tool may consequently strip the upper parts of the weed, leaving the root in the ground and intact.

Another known form of weed puller uses two spade-like blades to grip a weed under the soil. Driving the wide spade blades through the soil requires considerable effort on the part of the user. The wide spade blades will, when lifted, remove a significant amount of soil with any weed, leaving a hole in the soil that must be repaired. The edges of the spade blades may cut off roots rather than gripping them to enable pulling of the complete weed.

SUMMARY OF THE INVENTION

According to one aspect of the present invention there is provided a weed puller comprising:

a head;

at least three blades, each with an elongate pick-up arm having a gripping end;

mounting means mounting the blade on the head with the arms arranged symmetrically about a common centre line for movement of the blades between an open condition with the arms spaced apart at the gripping ends and a closed condition with the arms converging towards the gripping ends, with the gripping ends in engagement;

biasing means for biasing the blades into the open condition; and actuator means for moving the blades simultaneously from the open condition to the closed condition.

According to another aspect of the present invention there is provided a weed puller comprising:

a head;

at least three blades, each with a pick-up arm having a gripping end;

means mounting the blades on the head with the arms located symmetrically around a common centre line, for movement of the blades between an open condition with the gripping ends of the pick-up arms spaced apart, and a closed condition with the arms converging towards the gripping ends;

means for moving the blades simultaneously between the open and closed conditions; and the gripping end of each arm comprising two gripping faces converging towards an apex, the gripping faces of each arm being in face-to-face engagement with the gripping faces of each adjacent arm in the closed condition of the blades.

According to a further aspect of the present invention there is provided a weed puller comprising:

an elongate stem;

a head secured to one end of the stem;

a plurality of blades, each comprising an elongate pick-up arm and an operating arm projecting laterally from the pick-up arm;

pivot means mounting the blades on the head for movement between an open condition with the pick-up arm spaced apart and a closed condition with the pick-up arms converging;

link means extending along the stem and pivotally engaged with the operating arms of the blades such that movement of the link means longitudinally of the stem causes pivotal movement of the blades between the open and closed conditions.

Preferred embodiments of the weed puller use four blades, symmetrically arranged. Each blade has a pick-up head with two serrated gripping faces that engage face-to-face with the gripping faces of the adjacent heads. The pick-up heads thus engage a weed as they move towards the closed position to grasp the weed root firmly from all sides. Because of the clamping-type engagement with the weed root, the top of the weed is neither pulled off nor stripped, but gripped firmly so that it can be pulled from the ground, root and all.

The mechanism of the weed puller makes it useful for a number of other tasks, for example picking-up litter. The pick-up heads can pick-up individual pieces of paper or individual leaves.

BRIEF DESCRIPTION OF THE DRAWINGS

In the accompanying drawings which illustrate an exemplary embodiment of the present invention:

FIG. 1 is an elevation of a tool according to the present invention;

FIG. 3 is a cross section along lines 3—3 of FIG. 1;

FIG. 4 is a cross section along lines 4—4 of FIG. 1;

DETAILED DESCRIPTION

Figure 2:
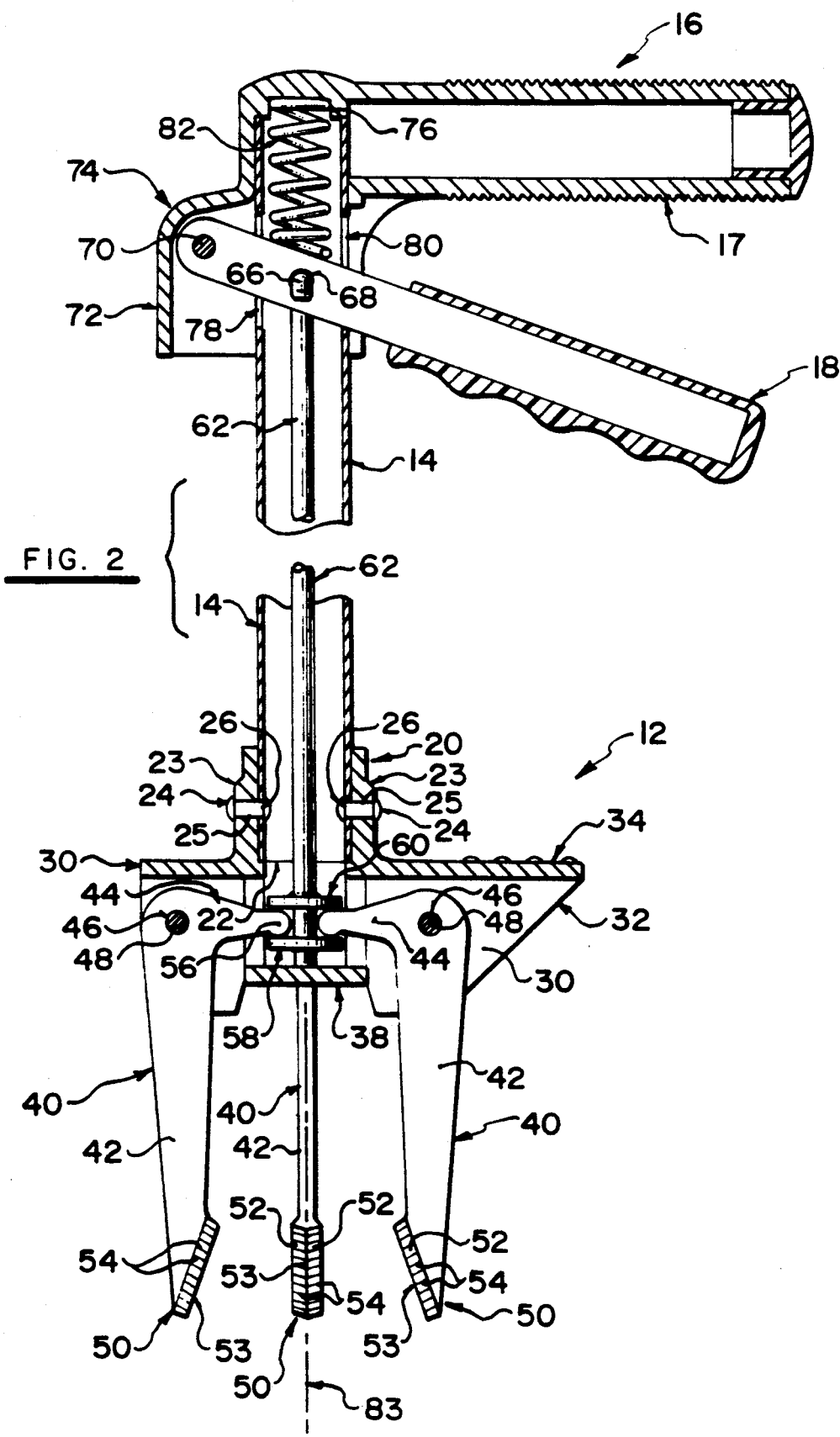
FIG. 2 is a cross section of the tool of FIG. 1.

Referring to the accompanying drawings, there is illustrated a weed puller 10 having a head 12 mounted on the end of an elongate stem 14. A handle 16 is mounted on the opposite end of the stem. The head has a hand grip 17 projecting from one side of the stem. Immediately below the hand grip is an operating lever 18.

The configuration of the head of the puller is most clearly illustrated in FIGS. 2 and 3. The head includes a centre tube 20 with an internal step 22 engaging the end of the hollow stem 14, as illustrated most particularly in FIG. 2. On opposite sides of the tube are bosses 23. Rivets 24 extend through holes 25 through the bosses and aligned holes 26 in the stem 20 to secure the stem 14 in the tube 20.

Four channels 30 are fixed to the lower end of the tube 20. These are spaced around the tube 20 at 90° from one another and downwardly open. One of the channels is extended outwardly as generally indicated by the reference number 32 in FIG. 2. The top of this channel is widened with two flanges 33 to provide a foot plate 34. A series of rounded knobs 36 are formed on the top of the foot plate. At the lower end of the tube 20 is a plate 38 which closes the end of the tube and forms gussets between the adjacent flanges of adjacent channels 30 as most particularly illustrated in FIG. 3.

Each of the channels 30 accommodates a respective one of four blades 40. Each blade is in the form of a bell crank with a pick-up arm 42 projecting downwardly from the associated channel and an operating arm 44 projecting from the channels into the tube 20. The blade has a hole 46 at the junction of the two arms. The hole 46 aligns with two holes 47 in the flanges of the associated channel 30. A pin 48 extends through the holes 47 and the hole 46 to pivotally mount the blade in the channel.

Each blade pick-up arm 42 has a gripping end 50 with two flat gripping faces 52. As shown in FIG. 4, the gripping faces are arranged at right angles to one another and meet at a linear apex 53. Each gripping face has a series of serrations 54 running from the apex to the side edge of the face.

The inner end of the operating arm 44 carries a rounded knob 56 that engages between two circular flanges 58 and 60 mounted on a rod 62. The flanges 58 and 60 slide in the tube 20 while the rod 62 serves as a link extending the length of the stem 14. At its upper end, the rod has a hook 66 engaging through a hole 68 in the lever 18. The lever 18 is pivotally mounted on the handle 16 by pivot pin 70 extending between two side plates 72 of a lateral extension 74 of the handle. The handle has a socket 76 that receives the end of the stem 14. Two slots 78 and 80 in the top end of the stem accommodate the lever 18 so that it can pass through the stem 14.

A coil spring 82 is housed within the upper end of stem 14. It is seated at one end in the handle socket 76 and at the other end on the lever 18 to bias the lever downwardly, thus biasing the blades 40 to the open position illustrated in FIGS. 1 and 2.

Figure 5:
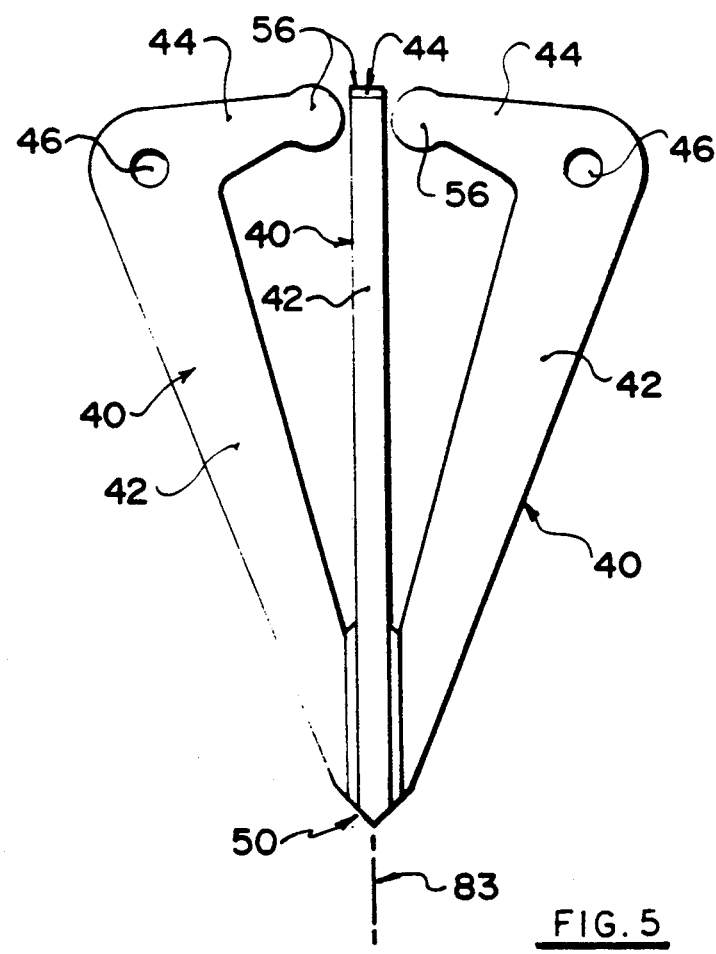
FIG. 5 is a side elevation showing the blades in the closed position.
Figure 6:
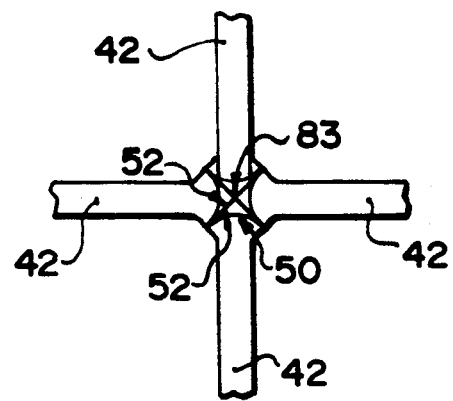
FIG. 6, appearing on the same sheet as FIG. 1, is an end view of FIG. 5.

With the puller in this condition, the blades may be positioned around a weed to be pulled and driven into the ground using foot pressure on the foot plate 34. Pulling up on the lever 18 then pulls on the link rod 62, pivoting the blades to the position illustrated in FIG. 5. With the blades in this position, the gripping faces 52 of adjacent blades engage one another face-to-face, with the apices of the gripping ends parallel and lying on a common centre line 83 concentric with the stem 14 and rod 62, and about which the blades are symmetrically arranged. The gripping ends will thus act to grip a weed firmly and exert sufficient pressure on the weed that it may be pulled, root and all, from the ground. The engagement of the gripping faces of the blades is illustrated in FIG. 6.

Because of the nature of this engagement, the tool can be useful for purposes other than pulling weeds. It may be used as a general purpose picking tool, for example for picking-up litter. The face-to-face engagement of the relatively large serrated gripping faces 52 ensures the tool can pick-up most any object, including single pieces of paper or single leaves.

While one embodiment of the present invention has been described in the foregoing, it is to be understood that other embodiments are possible within the scope of the invention. The invention is to be considered limited solely by the scope of the appended claims.

I claim:

1. A weed puller comprising:
   a head;
   at least three blades, each with a pick-up arm having a gripping end;
   mounting means mounting the blades on the head with the arms located symmetrically around a common centre line, for movement of the blades between an open condition with the gripping ends of the pick-up arms spaced apart, and a closed condition with the arms converging towards the gripping ends;
   means for moving the blades simultaneously between the open and closed conditions; and
   the gripping end of each arm comprising two gripping faces converging towards an apex, the gripping faces of each arm being in face-to-face engagement with the gripping faces of each adjacent arm and the apices of the gripping ends being substantially parallel in the closed condition of the blades.

2. A weed puller according to claim 1 wherein the means for moving the blades simultaneously between the open and closed conditions include:
   biasing means for biasing the blades into the open condition; and
   actuator means for moving the blades simultaneously from the open condition to the closed condition.

3. A weed puller according to claim 2 comprising four blades symmetrically arranged about the common centre line.

4. A weed puller according to claim 2 wherein each blade comprises a bell crank with an operating arm projecting laterally from the pick-up arm, the operating arms of the blades projecting towards the common centre line, and the actuator means comprise means for engaging the operating arms of the blades.

5. A weed puller according to claim 4 wherein the mounting means comprise pivot means pivotally mounting each blade on the head.

6. A weed puller according to claim 5 wherein in each blade, the pivot means and actuator means are located at an end of the pick-up arm opposite the gripping end.

7. A weed puller according to claim 6 wherein the actuator means comprise an elongate actuator member extending along the common centre line and means pivotally engaging the operating arms with the actuator member.

8. A weed puller according to claim 7 including an elongate hollow stem connected to the head and extending along the common centre line, around the elongate actuator member.

9. A weed puller according to claim 8 including fixed handle means mounted on the stem at an end thereof remote from the head.

10. A weed puller according to claim 9 including operating handle means mounted on the stem and connected to the actuator member for displacing the actuator member along the stem.

11. A weed puller according to claim 10 wherein the biasing means comprise a coil spring within the stem, first spring seat means secured to the stem and engaging one end of the spring and second spring seat means on the actuator member and engaging an opposite end of the spring.

12. A weed puller according to claim 1 wherein the gripping faces are serrated.

13. A weed puller according to claim 1 comprising four blades, with gripping faces of each gripping end being substantially perpendicular to one another.

* * * * *